US011437052B2

(12) United States Patent
Kim et al.

(10) Patent No.: US 11,437,052 B2
(45) Date of Patent: Sep. 6, 2022

(54) METHOD AND SYSTEM FOR PARALLEL AUDIO TRANSCODING

(71) Applicant: NAVER CORPORATION, Seongnam-si (KR)

(72) Inventors: Jae Hoon Kim, Seongnam-si (KR); Keunbaek Park, Seongnam-si (JP); Bong Sub Kim, Seongnam-si (KR); Seungjin Kim, Seongnam-si (KR); Seokjin Hong, Seongnam-si (KR); Seongcheol Jo, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 7 days.

(21) Appl. No.: 17/134,003

(22) Filed: Dec. 24, 2020

(65) Prior Publication Data

US 2021/0118458 A1    Apr. 22, 2021

Related U.S. Application Data

(63) Continuation of application No. PCT/KR2019/007614, filed on Jun. 25, 2019.

(30) Foreign Application Priority Data

Jun. 25, 2018    (KR) ........................ 10-2018-0072718

(51) Int. Cl.
*G10L 19/008*    (2013.01)
*G10L 19/16*    (2013.01)
*G06F 3/16*    (2006.01)

(52) U.S. Cl.
CPC ............ *G10L 19/173* (2013.01); *G06F 3/165* (2013.01); *G10L 19/008* (2013.01); *G10L 19/167* (2013.01)

(58) Field of Classification Search
CPC ...... G06F 3/165; G10L 19/167; G10L 19/173
(Continued)

(56) References Cited

U.S. PATENT DOCUMENTS 9,338,467 B1 *   5/2016   Gadepalli ............ H04N 19/184
10,236,008 B2 *  3/2019   Helmrich .............. G10L 19/008

FOREIGN PATENT DOCUMENTS

KR    10-2005-0091369    9/2005
KR    10-2012-0074306    7/2012
(Continued)

OTHER PUBLICATIONS

Audio Priming—Handling Encoder Delay i AAC https://developer.aaple.com/library/archive/documentation/quickTime/QTTFAppenG/QTTFAprnG.htmal, Sep. 3, 2016.*
(Continued)

*Primary Examiner* — Melur Ramakrishnaiah
(74) *Attorney, Agent, or Firm* — Greer Burns & Crain Ltd.

(57) ABSTRACT

A parallel audio transcoding method includes splitting audio into segments of a certain length; performing parallel transcoding by allocating the split segments to a plurality of encoders; and concatenating the segments encoded through the parallel transcoding and merging the same into a single encoded file. Performing parallel transcoding includes inserting additional regions, which overlap and neighbor each of the split segments, and sending the same to the encoders, and merging includes cutting out the additional regions from the encoded stream to create a stream corresponding to the split segments.

10 Claims, 9 Drawing Sheets

(58) Field of Classification Search
USPC .............................................. 700/94
See application file for complete search history.

(56) References Cited

FOREIGN PATENT DOCUMENTS

| KR | 10-2012-0128127 | 11/2012 |
| KR | 10-2013-0014561 | 2/2013 |
| KR | 10-2017-0133378 | 12/2017 |

OTHER PUBLICATIONS

Marina Bosi, et al., ISO/IEC MPEG-2 advanced audio coding, Journal of the Audio engineering society, 1997, vol. 45. No. 10, pp. 789-814.

Yasuo Sambe, et al., High-speed distributed video transcoding for multiple rates and formats, IEICE Transactions on Information and Systems, 2005.

Audio Priming—Handling Encoder Delay in AAC. https://developer.apple.com/library/archive/documentation/QuickTime/QTFF/QTFFAppenG/QTFFAppenG.html, Sep. 13, 2016.

Int'l Search Report issued in Int'l. App. No. PCT/KR2019/007614, dated Oct. 1, 2019.

\* cited by examiner

METHOD AND SYSTEM FOR PARALLEL AUDIO TRANSCODING

CROSS-REFERENCES TO RELATED APPLICATIONS

This is a continuation of International Application No. PCT/KR2019/007614, filed Jun. 25, 2019, which claims the benefit of Korean Patent Application No. 10-2018-0072718, filed Jun. 25, 2018.

BACKGROUND OF INVENTION

Field of Invention

The following description relates to a technology for performing audio transcoding.

Description of Related Art

With the recent expansion of on-demand video systems and a variety of video services offered by portals, there is an increasing need for transcoding (encoding) video content to make it compatible with a service provider's system.

In general, video service providers have their own encoding servers to perform encoding and transcoding through a compression algorithm (e.g., MPEG2 or H.264).

For instance, Korean Laid-Open Patent Publication No. 10-2005-0091369 (published on Sep. 15, 2005) discloses a technology for converting video coded in one format into another video coding format.

Since video encoding, especially of high-quality video, takes tremendous CPU load, encoding systems perform encoding in such a manner that only one video file is encoded in one encoding server.

This configuration hinders the need for fast service when delivering on-demand video service for real-time broadcast content. The existing video service providers are not able to provide seamless service due to the increase in time taken for encoding and transcoding.

BRIEF SUMMARY OF THE INVENTION

This summary is provided to introduce a selection of concepts in a simplified form that are further described below in the Detailed Description.

An object of the present disclosure is to provide a transcoding technology that splits audio into segments of a certain length and performs parallel transcoding.

Another object of the present disclosure is to provide a transcoding technology capable of precisely cutting an encoded bitstream along the boundaries of the split segments.

Another object of the present disclosure is to provide a transcoding technology capable of minimizing acoustic side effects of encoding techniques based on temporal models.

An embodiment of the present disclosure provides a parallel audio transcoding method, which is performed in a server implemented by a computer, including steps of: splitting audio into segments of a certain length; performing parallel transcoding by allocating the split segments to a plurality of encoders; and concatenating the segments encoded through the parallel transcoding and merging the same into a single encoded file, wherein the step of performing parallel transcoding includes a step of inserting additional regions, which overlap and neighbor each of the split segments, and sending the same to the encoders, and the step of merging includes a step of cutting out the additional regions from the encoded stream to create a stream corresponding to the split segments.

In one aspect, the length of each split segment and the length of each additional region may be determined as a multiple of the number of samples encoded at a time by an encoder.

In another aspect, the step of performing parallel transcoding may include adding a previous overlap region to the front of each split segment as an additional region.

In a still another aspect, the step of performing parallel transcoding may include adding priming samples in front of the previous overlap region by an encoder.

In a further aspect, the step of performing parallel transcoding may include adding a next overlap region to the back of each split segment as an additional region.

Another embodiment of the present disclosure provides a computer-readable recording medium with a program recorded therein for a computer to execute the parallel audio transcoding method.

A still another embodiment of the present disclosure provides a parallel audio transcoding system in a server implemented by a computer, the system including at least one processor configured to execute computer-readable instructions included in a memory, wherein the at least one processor executes a process of splitting audio into segments of a certain length; a process of performing parallel transcoding by allocating the split segments to a plurality of encoders; and a process of concatenating the segments encoded through the parallel transcoding and merging the same into a single encoded file. The process of performing parallel transcoding includes a process of inserting additional regions, which overlap and neighbor each of the split segments, and sending the same to the encoders. The process of merging includes a process of cutting out the additional regions from the encoded stream to create a stream corresponding to the split segments.

According to various embodiments of the present disclosure, when each segment of audio is encoded, the encoding is done for longer than the original duration, and then an encoded stream is precisely cut along the boundaries of the segments. Therefore, it is possible to minimize side effects of encoding techniques based on temporal models while removing priming samples from the encoded bitstream.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

While exemplary embodiments are illustrated and described, it will be appreciated that various changes can be made therein without departing from the spirit and scope of the invention.

Hereinafter, embodiments of the present disclosure will be described in detail with reference to the accompanying drawings.

The embodiments of the present disclosure relate to a technique for splitting an original file into a number of segments and performing parallel transcoding, and more particularly, to a method and a system for performing parallel audio transcoding.

The embodiments including what is disclosed in specific details in the present specification achieve considerable benefits in terms of time, cost savings, restorability, efficiency, and rationality through parallel audio transcoding.

Figure 1:
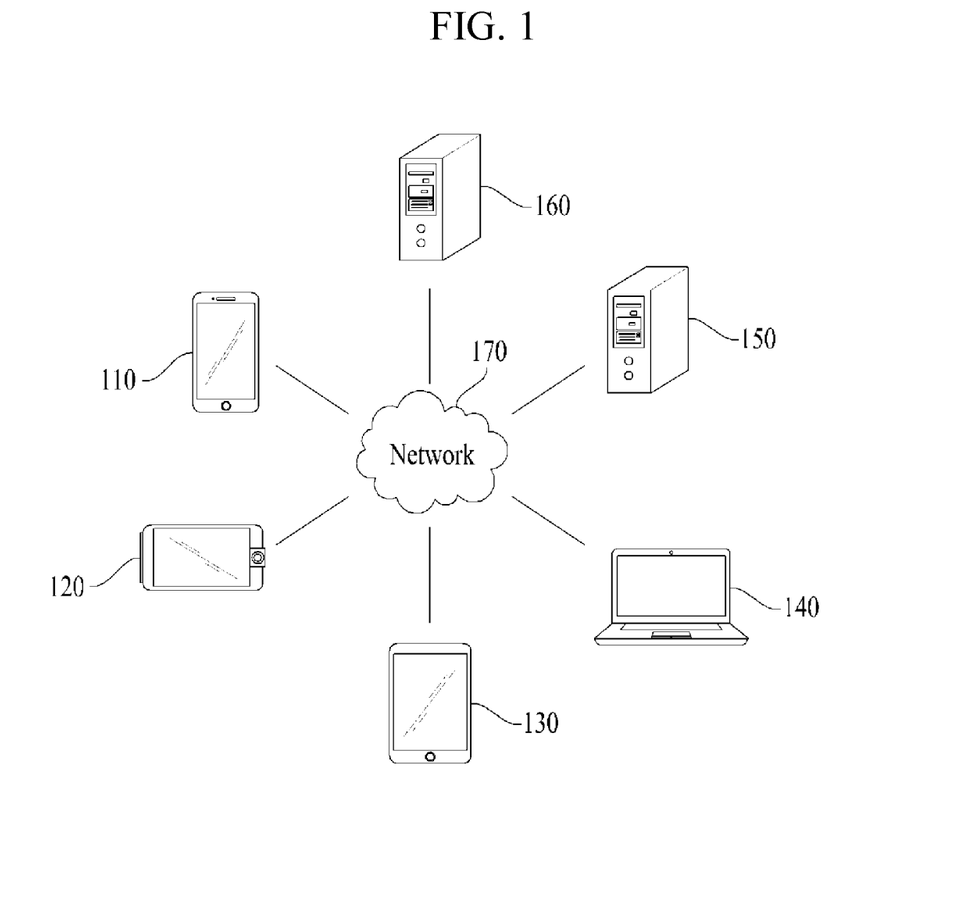
FIG. 1 is a diagram illustrating an example of a network environment according to an embodiment of the present disclosure.

FIG. 1 is a diagram illustrating an example of a network environment according to an embodiment of the present disclosure. FIG. 1 shows an example in which the network environment includes a plurality of electronic devices 110, 120, 130, 140, a plurality of servers 150, 160, and a network 170. FIG. is only an example for describing the present disclosure, and the number of electronic devices or the number of servers is not limited to what is shown in FIG. 1.

The plurality of electronic devices 110, 120, 130, 140 may be stationary terminals or mobile terminals that are implemented by a computer device. Examples of the plurality of electronic devices 110, 120, 130, 140 include a smart phone, a cellular phone, a navigation device, a computer, a laptop, a digital broadcasting terminal, a personal digital assistant (PDA), a portable multimedia player (PMP), a tablet PC, a game console, a wearable device, an Internet-of-Things (IoT) device, a virtual reality (VR) device, an augmented reality (AR) device, etc. Although FIG. 1 shows an image of a smartphone as an example of a first electronic device 110, the first electronic device 110 in the embodiments of the present disclosure may refer to one of various physical computer systems capable of substantially communicating with the other electronic devices 120, 130, 140, and/or the servers 150, 160 over the network 170, by using a wireless or wired communication method.

The method of communication is not particularly limited, and may include a communication method using near field communication between devices as well as a communication method using a communication network (e.g., a mobile communication network, wired Internet, wireless Internet, a broadcasting network, and a satellite network) which may be included in the network 170. For example, the network 170 may include one or more networks, including a personal area network (PAN), a local area network (LAN), a campus area network (CAN), a metropolitan area network (MAN), a wide area network (WAN), a broadband network (BBN), and the Internet. Also, the network 170 may include, but not limited to, one or more network topologies, including a bus network, a star network, a ring network, a mesh network, a star-bus network, a tree or hierarchical network, and the like.

Each of the servers 150, 160 may be configured as a computer device or a plurality of computer devices that provide instructions, codes, files, content, services, and the like through communication with the plurality of electronic devices 110, 120, 130, 140 over the network 170. For example, the server 150 may be a system that provides a first service to the plurality of electronic devices 110, 120, 130, 140 over the network 170, and the server 160 may be a system that provides a second service to the plurality of electronic devices 110, 120, 130, 140 over the network 170. In a more concrete example, the server 150 may provide, as the first service, a service (e.g., video service) targeted by an application, which is a computer program installed and run on the plurality of electronic devices 110, 120, 130, 140. In another example, the server 160 may provide, as the second service, a service for distributing a file for installing and running the above application to the plurality of electronic devices 110, 120, 130, 140.

Figure 2:
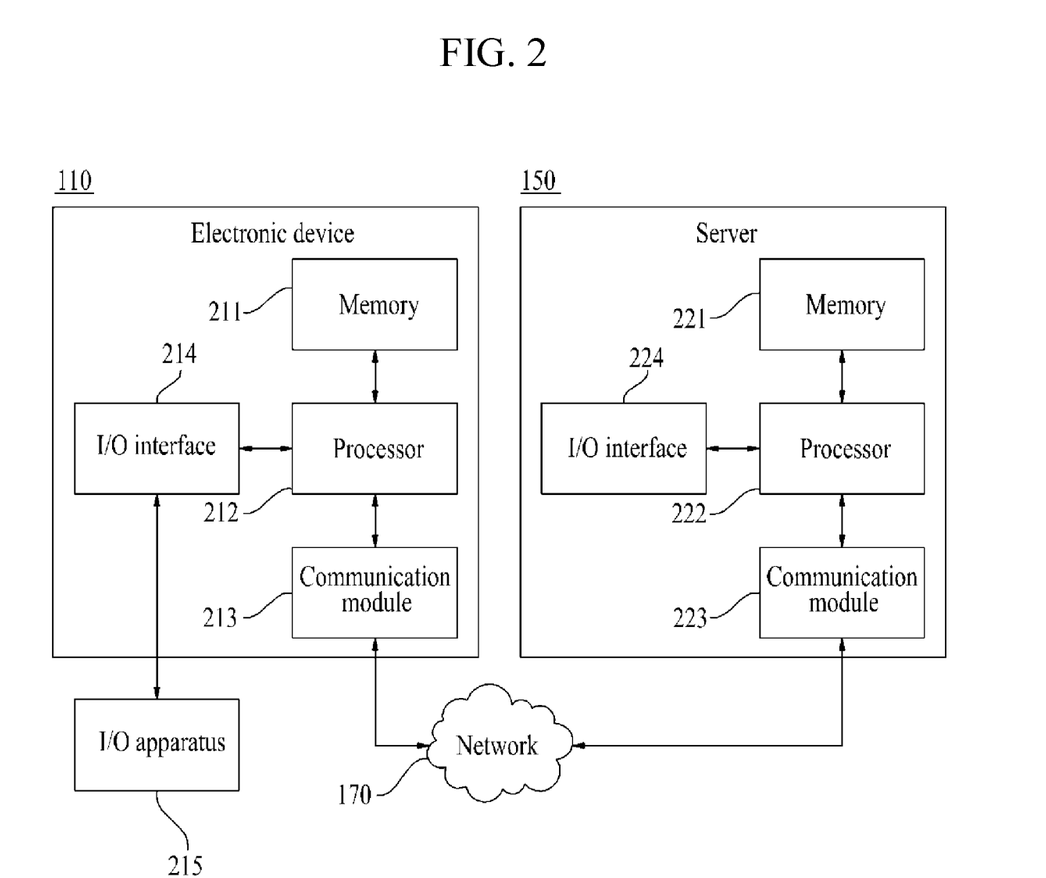
FIG. 2 is a block diagram for describing internal configurations of an electronic device and a server according to an embodiment of the present disclosure.

FIG. 2 is a block diagram for describing internal configurations of an electronic device and a server according to an embodiment of the present disclosure. FIG. 2 illustrates internal configurations of the first electronic device 110 and server 150 as an example of the electronic device and server. The internal configurations of the other electronic devices 120, 130, 140 and the server 160 may be the same as or similar to the internal configurations of the above-described first electronic device 110 and the server 150.

The first electronic device 110 may include a memory 211, a processor 212, a communication module 213, and an input/output interface 214, and the server 150 may include a memory 221, a processor 222, a communication module 223, and an input/output interface 224. The memories 211 and 221 are non-transitory computer readable recording media, and may include a permanent mass storage device such as random access memory (RAM), read only memory (ROM), a disk drive, a solid state drive (SSD), and flash memory. The permanent mass storage device, such as ROM, SSD, flash memory, and a disk drive, may also be included in the first electronic device 110 or the server 150 separate from the memories 211 and 221. Also, an operating system and at least one program code (e.g., code for a browser installed and run on the first electronic device 110, or code for an application installed and run on the first electronic device 110 to provide a particular service) may be stored in the memories 211 and 221. Such software components may be loaded from another computer-readable recording medium separate from the memories 211 and 221. A separate computer-readable recording medium may include, for example, a floppy drive, a disk, a tape, a DVD/CD-ROM drive, a memory card, etc. According to other embodiments, software components may be loaded to the memories 211 and 221, not through a computer-readable recording medium, but through the communication modules 213 and 223. For example, at least one computer program (e.g., the above-described application) may be loaded to the memories 211 and 221 by developers or a file distribution system (e.g., the above-described server 160) for distributing the application's installation file over the network 170.

The processors 212 and 222 may be configured to process computer program instructions by performing basic arithmetic operations, logic operations, and input/output operations. The instructions may be provided to the processors 212 and 222 by the memories 211 and 221 or the communication modules 213 and 223. For example, the processors 212 and 222 may be configured to execute received instructions according to a program code stored in a storage device such as the memories 211 and 221.

The communication modules 213 and 223 may provide a function for communication between the first electronic device 110 and the server 150 over the network 170, and may provide a function for communication between the first electronic device 110 and/or server 150 and another electronic device (e.g., the second electronic device 120) or another sever (e.g., the server 160). As an example, a request created by the processor 212 of the first electronic device 110 according to a program code stored in a recording device such as the memory 211 may be transmitted to the server 150 over the network 170 under the control of the communication module 213. Inversely, a control signal, an instruction, content, a file, etc., provided under control of the processor 222 of the server 150 may be received by the first electronic device 110 through the communication module 213 of the first electronic device 110 after passing through the communication module 223 and the network 170. For example, a control signal, an instruction, content, a file, etc., of the server 150 received through the communication module 213 may be transmitted to the processor 212 or the memory 211, and content, a file, etc., may be stored in a recording medium (the above-described permanent storage device) that the first electronic device 110 may further include.

The input/output interface 214 may be a means used for interfacing with an I/O apparatus 215. For example, input devices of the I/O apparatus 215 may include, for example, a keyboard, a mouse, a microphone, and a camera, and output devices of the I/O apparatus 215 may include, for example, a display, a speaker, and a haptic feedback device. As another example, the input/output interface 214 may interface with a device in which an input function and an output function are integrated into a single function, such as a touchscreen. The I/O apparatus 215 may be configured as a single device integrated with the first electronic device 110. Also, the input/output interface 224 of the server 150 may interface with an input or an output device (not shown) that may be connected to the server 150 or included in the server 150. In a more concrete example, when processing computer program instructions loaded to the memory 211, the processor 212 of the first electronic device 110 may display content or a service screen configured using data provided from the server 150 or second electronic device 120 on a display through the input/output interface 214.

According to other embodiments, the first electronic device 110 and the server 150 may include more components than those shown in FIG. 2. For example, the first electronic device 110 may include at least some of the above-mentioned input and output devices of the I/O apparatus 215, or may further include other components, such as a transceiver, a global positioning system (GPS) module, a camera, a variety of sensors, a database (DB), etc. In a more concrete example, if the first electronic device 110 is a smartphone, the first electronic device 110 may be configured to further include a variety of components, such as an acceleration sensor, a gyro sensor, a camera module, various physical buttons, a button using a touch panel, an I/O port, a vibrator for vibration, etc., which are generally included in the smartphone.

As a method for increasing video encoding speed, a technology for splitting an original input file into a number of segments, performing parallel encoding, and then merging the encoded segments into one file may be used.

Figure 3:
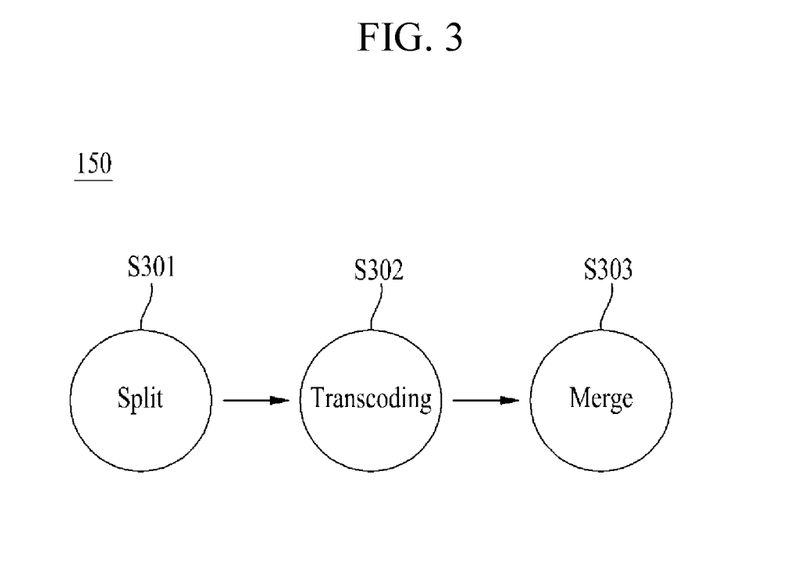
FIG. 3 is a flow diagram illustrating a parallel transcoding method according to an embodiment of the present disclosure.

FIG. 3 is a flowchart illustrating a basic process for parallel transcoding according to an embodiment of the present disclosure.

The server 150 according to this embodiment serves as a platform that provides a video service for providing video content including audio and video to the plurality of electronic devices 110, 120, 130, 140, which are clients. The server 150 may provide a video service in conjunction with an application installed on the electronic devices 110, 120, 130, 140.

In the server 150, the processor 222 functions as a component for performing the parallel transcoding method of FIG. 3. In some embodiments, the processor 222 may be divided into two or more components to represent its parallel transcoding functions.

The processor 222 may control the server 150 to perform the steps S301 through S303 included in the parallel transcoding method of FIG. 3. For example, the processor 222 may be implemented to execute instructions according to the operating system's code and at least one program code that are included in the memory 221.

The parallel transcoding method performed by the server 150 may basically include the step S301 of splitting an original input file into segments of a certain length, the step S302 of performing parallel transcoding on each segment, and the step S303 of concatenating the transcoded segments and merging them into a single encoded file.

Figure 4:
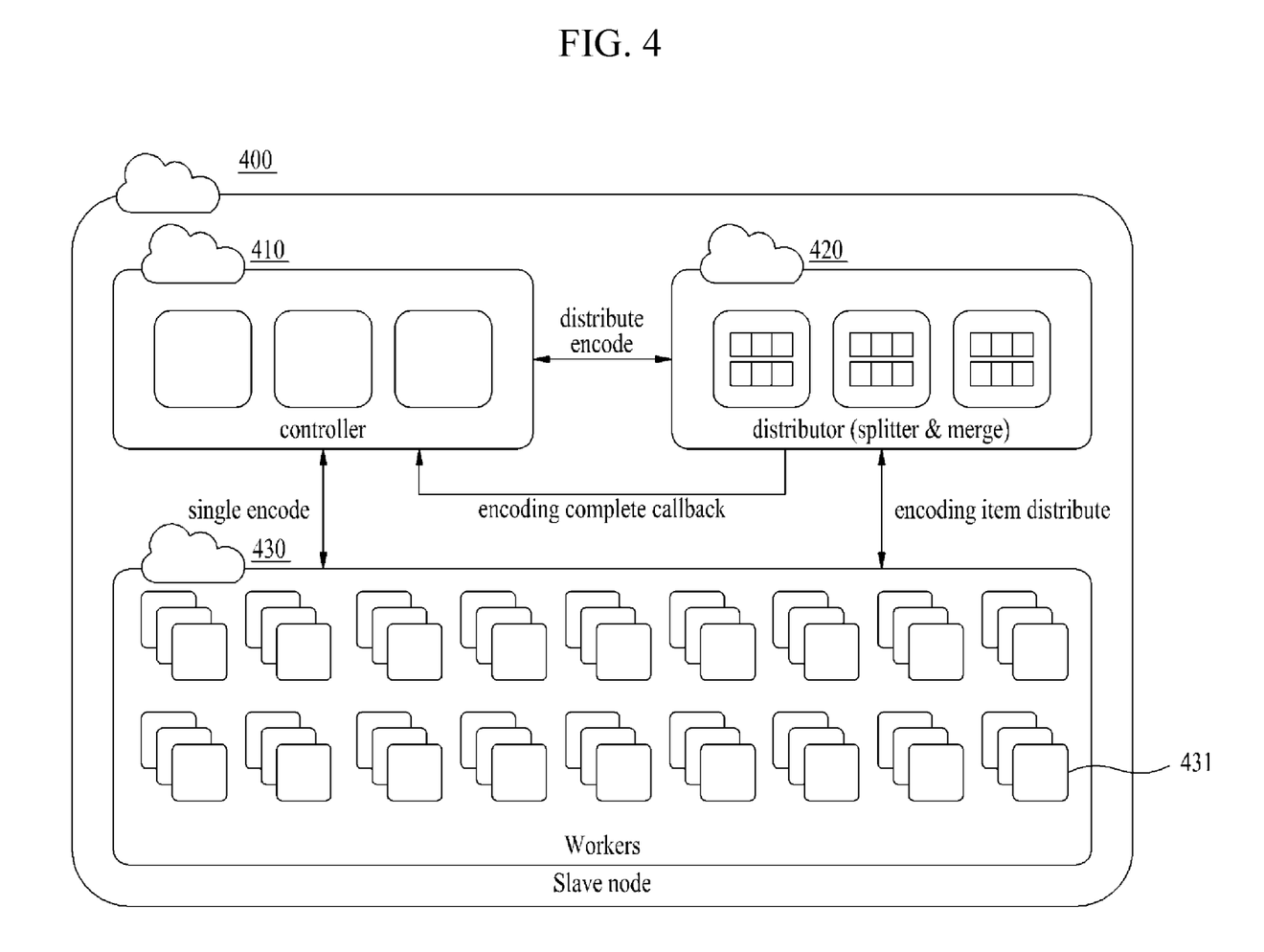
FIG. 4 is a diagram of components that may be included in a parallel transcoding system according to an embodiment of the present disclosure.

FIG. 4 is a diagram illustrating an example of components that may be included in a parallel transcoding system according to an embodiment of the present disclosure.

As illustrated in FIG. 4, the parallel transcoding system 400 may include a controller 410, a splitter and merger (distributor) 420, and an encoding performer 430 as the components for parallel transcoding. In an example, the controller 410 and the splitter and merger 420 may be included in the processor 222 of the server 150 explained with reference to FIGS. 1 and 2. Also, the encoding performer 430 consists of workers 431 which are unit transcoders for performing an encoding task, and each of the workers 431 is a separate computer device connected to the server 150 which serves as an encoding server that performs a task assigned by the splitter and merger 420.

The controller 410 serves to manage the overall status of an encoding task. The controller 410 may control an encoding task required to provide a video service in response to a request from the electronic devices 110, 120, 130, 140. The splitter and merger 420 is a distributing entity which is in charge of parallel transcoding operation. Specifically, the splitter and merger 420 serves to split an original input file into segments of an appropriate length for an encoding task requested by the controller 410, distributes the segments to the corresponding workers 431 in the encoding performer 430, and merges the segments encoded by the workers 431 into one encoded file. One or more segments may be distributed to one worker 431, and distribution may be determined based on the length (size) of the segment or the load of the worker. Various known techniques may be used for distribution logic.

Each of the workers 431 serves to encode a segment distributed by the splitter and merger 420 and forwards the encoded segment to the splitter and merger 420.

Therefore, the parallel transcoding system 400 may split the original file and perform parallel transcoding, thereby improving the overall encoding time and distributed encoding performance for video service.

Figure 5:
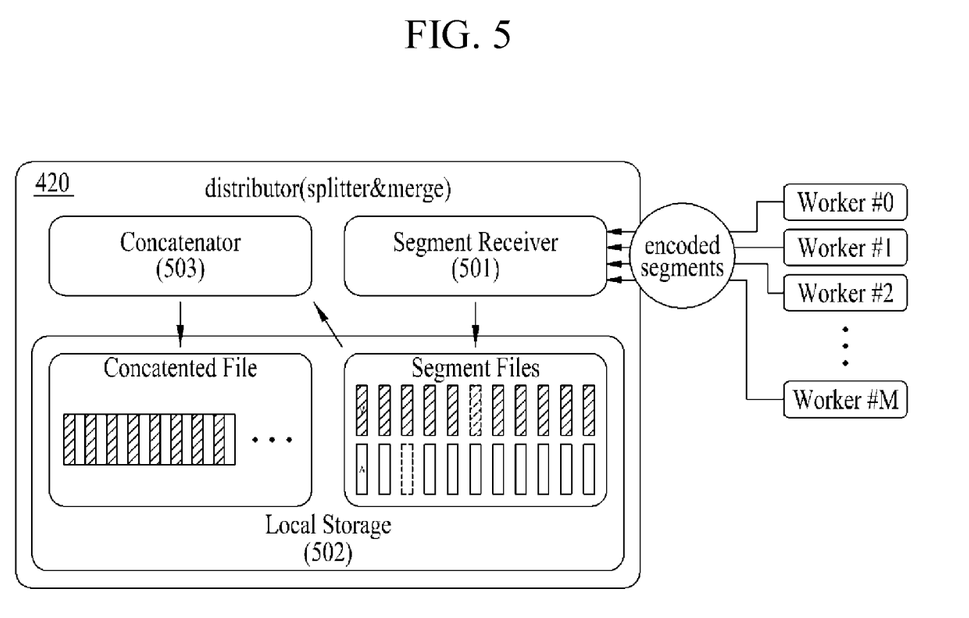
FIG. 5 is an exemplary diagram for describing a process of merging encoded segments into one file according to an embodiment of the present disclosure.

FIG. 5 is an exemplary diagram for describing a process of merging encoded segments into one encoded file according to an embodiment of the present disclosure.

The splitter and merger 420 is a component for merging, and may include a segment receiver 501, a local storage 502, and a concatenator 503. While the local storage 502 is shown in FIG. 5 to be provided within the splitter and merger 420 and, thus within the processor 222 of the server 150, it may also be provided separately from the processor 222 and accessible by the splitter and merger 420 when needed.

The segment receiver 501 serves to receive encoded segments from the workers 431 (Worker_0, Worker_1, Worker_2, . . . , Worker_M) to which the segments of the original file are assigned.

To concatenate the segments encoded by the workers 431 (Worker_0, Worker_1, Worker_2, . . . , Worker_M) by the concatenator 503, they need to be gathered in one storage 502.

The segment receiver 501 stores the encoded segment files received from the workers 431 (Worker_0, Worker_1, Worker_2, . . . , Worker_M) in the local storage 502. For a data packet corresponding to video, distributed encoding may be performed on a video stream V and an audio stream A, separately, and segment files for the video stream and segment files for the audio stream may be stored separately in the local storage 502.

The concatenator 503 may create an encoded packet (i.e., a concatenated file) by sequentially concatenating the segment files stored in the local storage 502 in segment order based on segmentation information. In this case, the concatenator 503 may create one encoded file by temporally interleaving the segment files for the video stream and the segment files for the audio stream, and store the encoded file as an output in the local storage 502.

Accordingly, the present disclosure may further improve the problems with transcoding time by splitting an original file into a number of segments and performing parallel transcoding by using a plurality of workers (i.e., encoders).

Hereinafter, a concrete embodiment of a method and a system for parallel audio transcoding will be described.

A general encoding technology involves sequential decoding and encoding of an input audio stream and, therefore, the overall transcoding time is proportional to the playback time of the original audio stream.

Therefore, in order to reduce the audio encoding time, an input audio stream may be split into segments of an appropriate length, then parallel transcoding may be performed by two or more encoders, and then the transcoded segments may be merged into one stream.

However, the following problems may occur depending on the characteristics of an audio encoding algorithm.

An MDCT (modified discrete cosine transform)-based audio encoding algorithm requires adding a bundle of samples called "priming samples" over a certain duration so that original PCM (pulse code modulation) samples at the front are decoded properly. The length of the priming samples may differ depending on the implementation of an audio encoder. Once parallel-encoded segments are merged into one stream, a clicking sound such as a tick may be heard due to the priming samples added in the process of performing encoding on each segment. Moreover, the addition of the priming samples may make the final transcoding result longer than the overall playback time of the original file. The shorter the split segments and the larger the number of split segments, the greater the difference. Due to this, when both audio and video are encoded, the audio and the video may not be in synchronization.

Moreover, in some of the techniques used in audio encoding algorithms, information generated in the process of encoding temporally preceding samples may be used. Typical examples of these techniques include techniques based on human psychoacoustic models, such as a continuous masking effect, in which, when a loud sound (masker) is generated at a specific time, it will be difficult to hear a sound (maskee) generated before and after the loud sound. Accordingly, when a specific segment is cut and encoded, there is no information generated in the process of encoding preceding and subsequent segments, thereby causing acoustic differences in output between these encoding techniques and the existing sequential encoding method.

To overcome the above-described problems, the present disclosure proposes a method in which, when each segment is encoded, the encoding is done for longer than the original duration, and then an encoded stream is precisely cut along the boundaries of the segments.

FIGS. 6 to 9 are exemplary views for describing a process of splitting and encoding audio according to an embodiment of the present disclosure.

Figure 6:
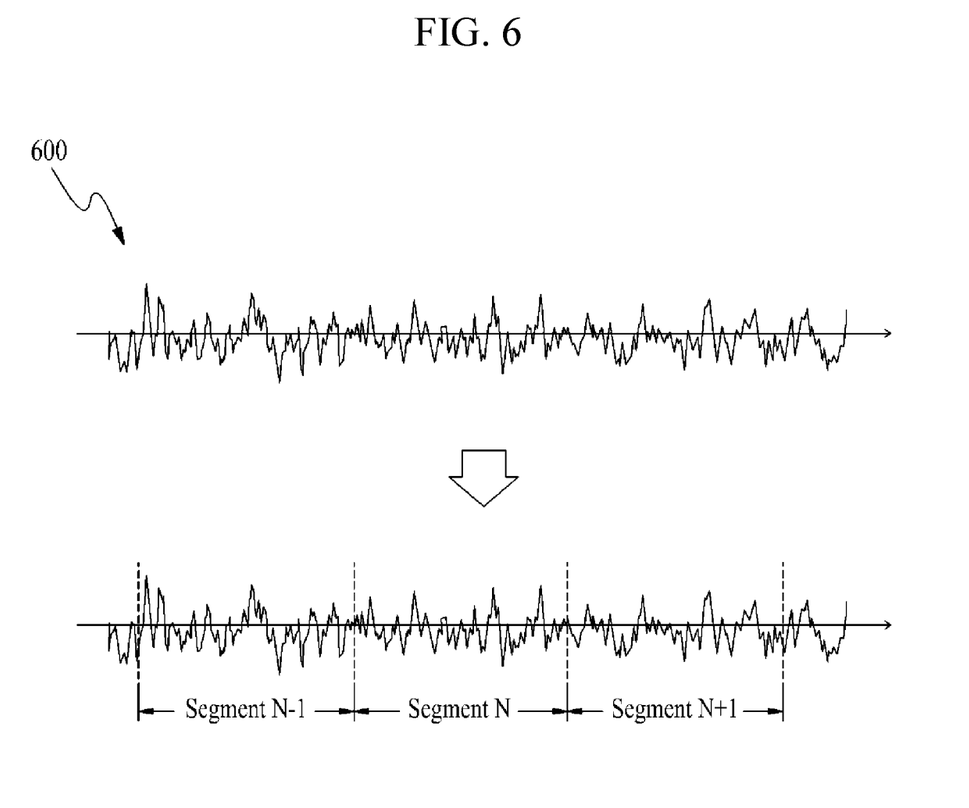
FIGS. 6 to 9 are exemplary illustrations for describing a process of splitting and encoding audio according to an embodiment of the present disclosure.

Referring to FIG. 6, when PCM samples of an original file 600 are inputted, the splitter and merger 420 may split the original file 600 into a plurality of segments ( . . . , Segment N−1, Segment N, Segment N+1, . . . ).

The splitter and merger 420 determines the length of a segment during which the segment is originally intended to be encoded as a multiple of the number of samples (called a frame) encoded at a time by an encoder. The reason why the length of a segment is determined as a multiple of the frame length is to cut and extract only the original segment. Another reason is that an encoded audio stream can be cut only in frames.

The length of each segment may be defined by Equation 1:

$$\text{segment\_length} = \text{frame\_length} \times n, \quad [\text{Equation 1}]$$

wherein segment_length is the length of a segment to be encoded (the number of samples), frame_length is the number of samples to be encoded at a time by an encoder, and n is an integer.

Figure 7:
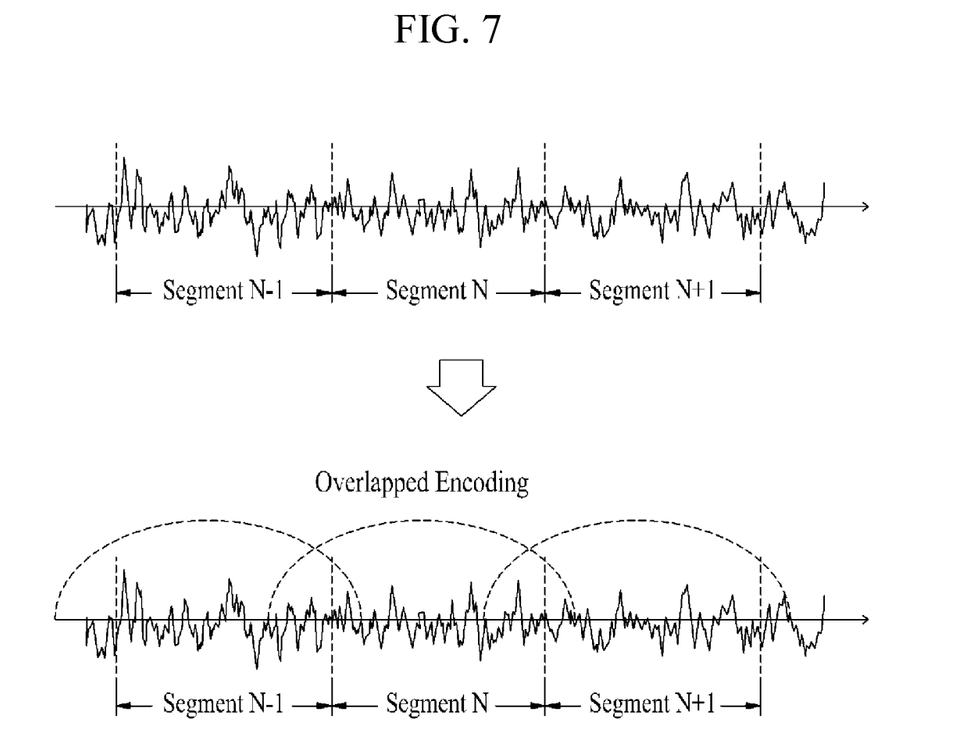

Referring to FIG. 7, the splitter and merger 420 sets additional overlap regions at the front and the back of each of the segments ( . . . , Segment N−1, Segment N, Segment N+1, . . . ) to include a region (i.e., at least one frame) of the segments immediately neighboring each of the segments being set with the overlap regions. This is to avoid side effects relating to lowering of acoustic performance that may occur in segmented encoding, by ensuring that there is previous and next data to be used in techniques based on temporal models of audio encoding algorithms.

A previous overlap region added to the front of each segment may be defined as in Equation 2, and a next overlap region added to the back of each segment may be defined as Equation 3:

$$\text{previous\_overlap\_length} = \text{priming\_length} \% \text{frame\_length} + \text{frame\_length} \times a, \quad [\text{Equation 2}]$$

where previous_overlap_length is the length of the previous overlap region, priming_length is the number of bundled samples added by an encoder, frame_length is the number of samples encoded at a time by an encoder, and a is an integer.

$$\text{next\_overlap\_length} = \text{frame\_length} \times b, \quad [\text{Equation 3}]$$

where next_overlap_length is the length of the next overlap region, frame_length is the number of samples encoded at a time by an encoder, and b is an integer.

The length of the previous overlap region and the length of the next overlap region are also determined as a multiple of the number of samples encoded at a time by an encoder.

Figure 8:
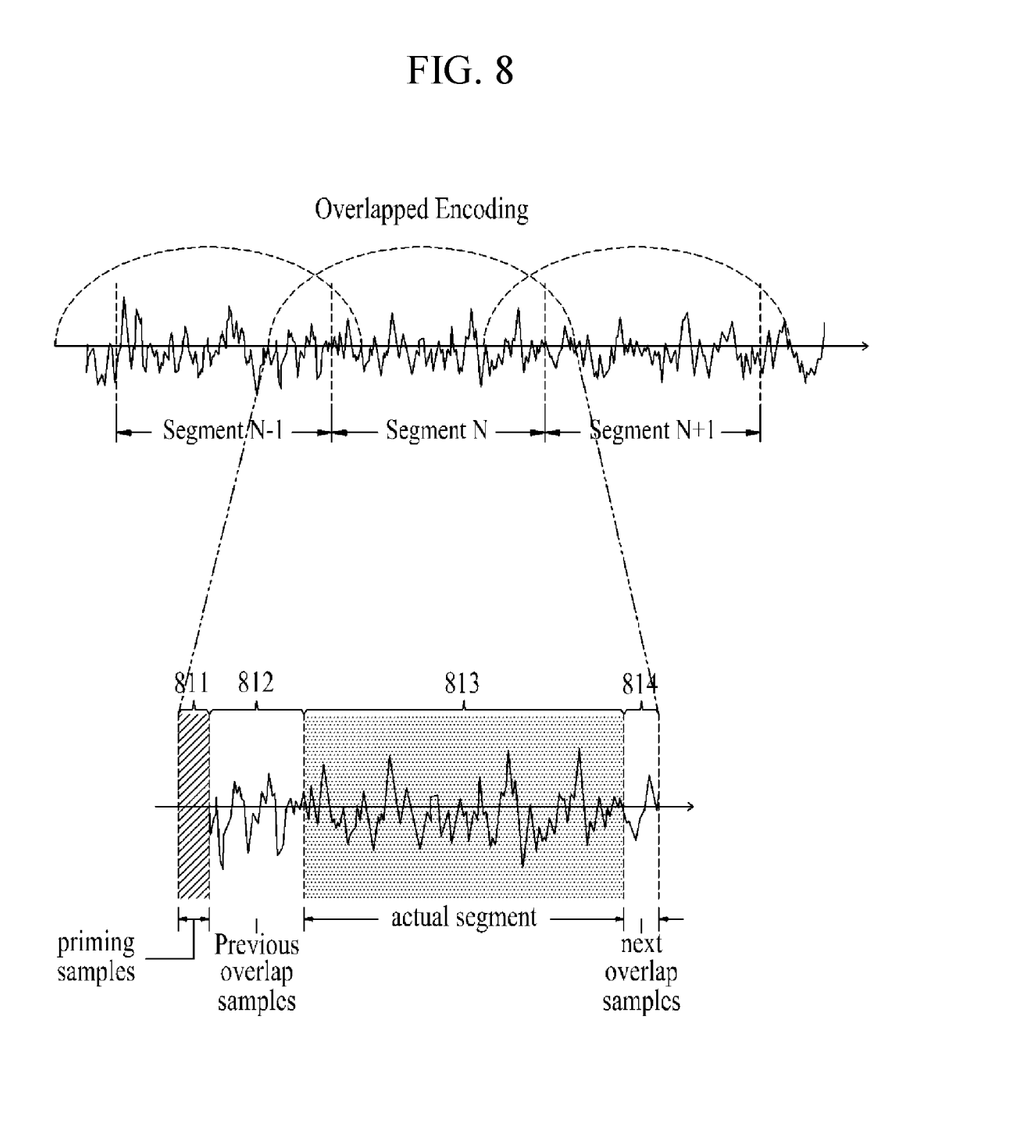

As illustrated in FIG. 8, when the splitter and merger 420 splits an original file 600 into a plurality of segments, the total number of samples (total_encoding_length) actually encoded by an encoder for each segment includes priming samples (priming_length) 811, a previous overlap region (previous_overlap_length) 812, an actual segment 813, and a next overlap region (next_overlap_length) 814, which can be summarized as in Equation 4:

$$\text{total\_encoding\_length} = \text{priming\_length} + \text{previous\_overlap\_length} + \text{segment\_length} + \text{next\_overlap\_length} = \text{frame\_length} \times c \quad \text{[Equation 4]}$$

Accordingly, the total number of samples actually encoded by an encoder for each segment equals a multiple of the number of samples encoded at a time by an encoder, that is, a multiple of the frame length.

The splitter and merger 420 sends the total number of samples (given by Equation 4), including the priming samples, previous overlap region, and next overlap region for each segment, to a worker 431 of the encoding performer 430.

Afterwards, once the encoding of the samples in each segment whose length is defined by Equation 4 is completed, the splitter and merger 420 may create a final encoding result for the original file by concatenating the encoded segments in order.

Figure 9:
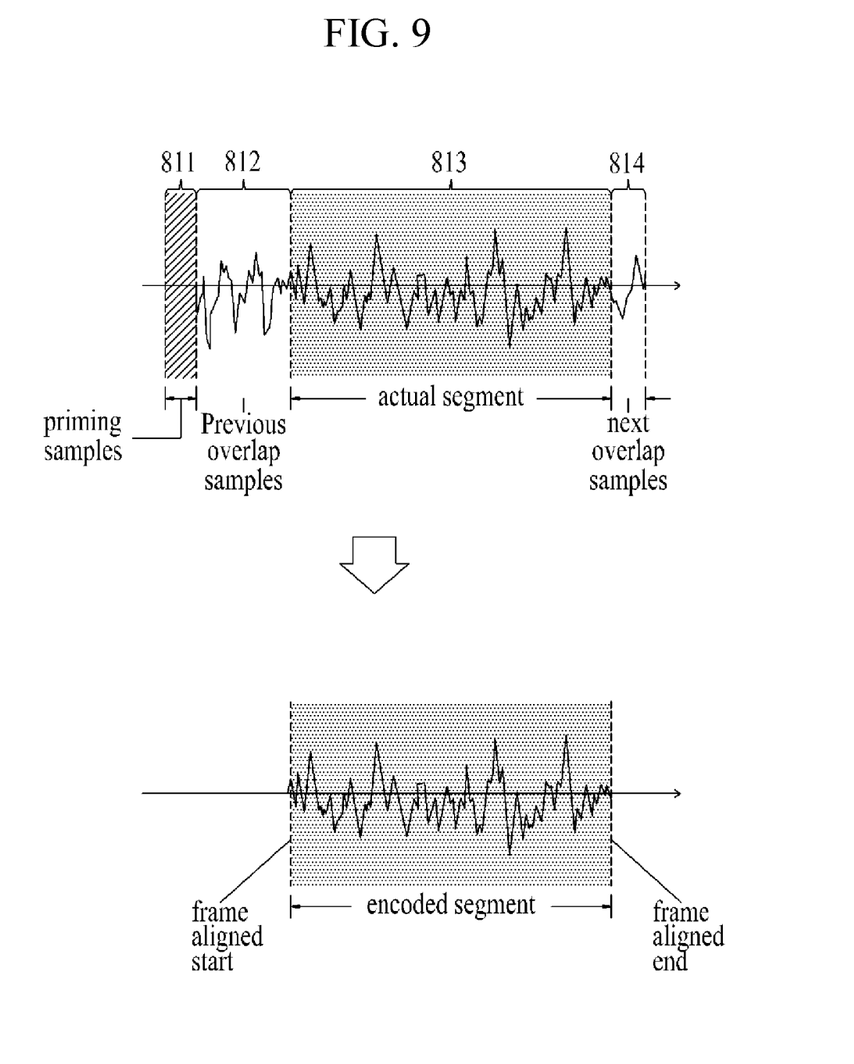

Referring to FIG. 9, in the process of concatenating the encoded segments, only the bitstream portion corresponding to the actual segment 813 is left, but the bitstream portion corresponding to the priming samples 811 and previous overlap region 812 and the bitstream portion corresponding to the next overlap region 814 are omitted.

In other words, when concatenating the encoded segments, the priming samples 811 and the previous overlap region 812 are cut out from the encoded stream, only the bitstream portion corresponding to the actual segment 813 is aligned per frame, and then the next overlap region 814 is cut out.

Since the priming samples 811, the previous overlap region 812, the actual segment 813, and the next overlap region 814 are all a multiple of the frame length, the priming samples 811, the previous overlap region 812, and the next overlap region 814 may be precisely cut out from the encoded stream along the boundary of the actual segment 813.

As seen from above, according to the embodiments of the present disclosure, when each segment of audio is encoded, the encoding is done for longer than the original duration, and then an encoded stream is precisely cut along the boundaries of the segments. Therefore, it is possible to minimize side effects of encoding techniques based on temporal models while removing priming samples from the encoded bitstream.

The above-described system of the present invention may be implemented by hardware elements, software elements, and/or a combination of hardware and software elements. For example, the system and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. A processor may run an operating system (OS) and one or more software applications running on the OS. Furthermore, the processor may access, store, manipulate, process, and generate data in response to the execution of software. For ease of understanding, one processor has been illustrated as being used, but a person having ordinary skill in the art may be aware that the processor may include a plurality of processing elements and/or a plurality of types of processing elements. For example, the processor may include a plurality of processors or a single processor and a single controller. Furthermore, other processing configurations, such as a parallel processor, are also possible.

Software may include a computer program, code, an instruction, or a combination of one or more of these, and may configure the processor so that it operates as desired or may instruct the processor independently or collectively. The software and/or data may be embodied in a machine, a component, a physical device, a computer storage medium, or a device of any type, in order to be interpreted by the processor or to provide an instruction or data to the processor. The software may be distributed to computer systems connected over a network, and may be stored or executed in a distributed manner. The software and data may be stored in one or more computer-readable recording media.

The method according to the embodiment may be implemented in the form of a program instruction executable by various computer means and stored in a computer-readable recording medium. The medium may be one that continuously stores a computer-executable program or temporarily stores it for execution or downloading. Further, the medium may be a variety of recording means or storage means in the form of a combination of a single hardware or a plurality of hardware, but is not limited to a medium directly connected to any computer system, but may be dispersed on a network. Examples of the medium include a magnetic medium such as a hard disk, a floppy disk and a magnetic tape, an optical recording medium such as CD-ROM and DVD, a magneto-optical medium such as a floptical disk, and hardware devices that are specially configured to store program instructions including ROM, RAM, flash memory, and the like. As another example of the medium, a recording medium or a storage medium that is managed by a web site or a server that supplies or distributes applications or various other software is also enumerated.

As described above, although the embodiments have been described in connection with the limited embodiments and the drawings, those skilled in the art may modify and change the embodiments in various ways from the description. For example, proper results may be achieved although the aforementioned descriptions are performed in an order different from that of the described method, and the aforementioned elements, such as the system, configuration, device, and circuit, are coupled or combined in a form different from that of the described elements or replaced or substituted with other elements or equivalents.

Accordingly, other implementations, other embodiments, and the equivalents of the claims fall within the scope of the claims.

The invention claimed is:

1. A parallel audio transcoding method, which is performed in a server implemented by a computer, the method comprising the steps of:
   splitting an audio stream into segments of a certain length;
   performing parallel transcoding the segments, the step of performing parallel transcoding including allocating the split segments to a plurality of encoders and encoding the segments by the encoders; and
   concatenating the segments encoded through the parallel transcoding, and merging the concatenated segments in an encoded stream into a single encoded file,
   wherein the step of encoding the segments includes a step of inserting additional regions to the split segments, each of the additional regions overlapping each of the split segments, and sending the split segments with the inserted additional regions to the encoders such that streams including the split segments and the additional regions are encoded by the encoders, and wherein the step of concatenating includes a step of cutting out the additional regions from the encoded streams to create a stream corresponding to the split segments as the single encoded file.

2. The method of claim 1, wherein a length of each of the split segments and a length of each additional region are determined as a multiple of a number of samples encoded at a time by a corresponding encoder.

3. The method of claim 1, wherein the step of encoding comprises adding a previous overlap region to a front of each of the split segments as the additional regions.

4. The method of claim 3, wherein the step of encoding comprises adding priming samples in front of the previous overlap region by a corresponding encoder.

5. The method of claim 3, wherein the step of encoding comprises adding a next overlap region to a back of each of the split segments as the additional regions.

6. A non-transitory computer-readable recording medium with a program recorded therein for instructing a computer to execute the parallel audio transcoding method of claim 1.

7. A parallel audio transcoding system in a server implemented by a computer, the system comprising at least one processor configured to execute computer-readable instructions included in a memory, wherein the at least one processor processes:

splitting audio into segments of a certain length;

performing parallel transcoding the segments, the step of performing parallel transcoding including allocating the split segments to a plurality of encoders and encoding the segments by the encoders; and concatenating the segments encoded through the parallel transcoding, and merging the concatenated segments in an encoded stream into a single encoded file, wherein the step of encoding the segments includes inserting additional regions to the split segments, each of the additional regions overlapping each of the split segments, and sending the split segments with the inserted additional regions to the encoders such that streams including the split segments and the additional regions are encoded by the encoders, and wherein the step of concatenating includes a process of cutting out the additional regions from the encoded streams to create a stream corresponding to the split segments as the single encoded file.

8. The system of claim 7, wherein a length of each of the split segments and a length of each additional region are determined as a multiple of a number of samples encoded at a time by a corresponding encoder.

9. The system of claim 7, wherein the process of encoding comprises a process of adding a previous overlap region to a front of each of the split segments and a next overlap region to a back of each of the split segments, as the additional regions.

10. The system of claim 9, wherein the process of encoding comprises a process of adding priming samples in front of the previous overlap region by a corresponding encoder.

* * * * *